United States Patent Office 3,361,791
Patented Jan. 2, 1968

3,361,791
3,16,20-TRIOXYGENATED 17aβ-METHYL-D-HOMO-C-NOR-18-NOR-5α-PREGNANES
William F. Johns, Morton Grove, and Ivar Laos, Skokie, Ill., assignors to G. D. Searle & Co., Chicago, Ill., a corporation of Delaware
No Drawing. Filed Aug. 3, 1964, Ser. No. 387,170
4 Claims. (Cl. 260—476)

This invention relates to 3,16,20-trioxygenated 17aβ-methyl - D - homo-C-nor-18-nor-5α-pregnanes and processes for the preparation thereof. More particularly, this invention provides novel, useful, and unobvious chemical compounds of the formula

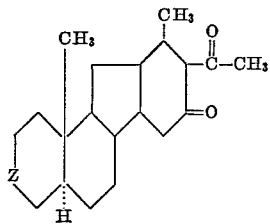

wherein Z represents a carbonyl, β-(hydroxy)methylene, or β-(lower alkanoyloxy)methylene radical.

Those skilled in the art will recognize that the foregoing compounds exist not only in the ketonic state as depicted, but also as enols eventuating from a prototropic tautomerization whereby oxo is converted to hydroxyl and a double bond is introduced thus

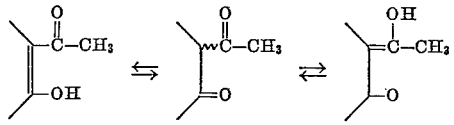

Relative amounts of such different forms of the same compounds which obtain under any given circumstance are dependent upon the physical state of the substances involved, and their environment: whether they be solid or liquid and, if dissolved, in what solvent and at what pH. Because the various forms in which tautomers exist cannot readily be represented by a single formula, and also because the ketonic forms predominate and the compounds as isolated by the preparative procedures hereinafter exemplified, the subject compounds are enformulated exclusively as ketones. However, both keto and enol forms alike are within the ambit of the described invention.

The compounds to which this invention relates are characterized by valuable pharmacological properties. Thus, for example, they are androgens; they are antibiotics effective against protozoa such as Tetrahymena gelleii and adapted to inhibit dicotyledenous seed germination; and they are anti-inflammatory agents disposed to counteract edema-formation associated with the inflammatory response to tissue insult.

Preparation of the instant compounds proceeds by heating 3β - acetoxy-17aβ-methyl-5α,22β-D-homo-C-nor-18-norspirostan with performic acid (85% formic acid plus 30% hydrogen peroxide) and hydrolyzing the product with methanolic potassium hydroxide to give 17aβ-methyl - D - homo-C-nor-18-nor-5α-pregnane-3β,16β,20α-triol. The triol, in turn, is mixed with acetone in the presence of p-toluenesulfonic acid to form the 16,20-cyclic acetal, which is esterified in the 3-position with benzoyl chloride and pyridine. The acetal grouping is thereupon cleaved with methanolic p-toluenesulfonic acid, and the resultant 3β - benzoyloxy-17aβ-methyl-D-homo-C-nor-18-nor-5α-pregnane-16β,20α-diol is oxidized with chromium trioxide and sulfuric acid in tetrahydrofuran to 3β-benzoyloxy - 17aβ - methyl - D-homo-C-nor-18-nor-5α-pregnane-16,20-dione, one of the preferred embodiments of this invention. Cleavage of the 3-ester linkage therein with Claisen's alkali in an ethereal medium affords 3β-hydroxy-17aβ-methyl-D-homo-C-nor-18-nor-5α - pregnane - 16,20-dione, another preferred embodiment of the invention. Oxidation of the latter compound with acetonic chromium trioxide and sulfuric acid yields 17aβ-methyl-D-homo-C-nor-18-nor-5α-pregnane-3,16,20-trione, a third preferred embodiment of the invention.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

(A) *17aβ - methyl-D-homo-C-nor-18-nor-5α-pregnane-3β,16β,20α-triol.*—To a stirred suspension of 134 parts of 3β - acetoxy - 17aβ-methyl-5α,22β-D-homo-C-nor-18-norspirostan in 3240 parts of 85% formic acid is added 300 parts of 30% hydrogen peroxide. The resultant mixture is heated to 76° and maintained in the range 74–78° with continued stirring for 55 minutes. A clear solution eventuates. The solution is cooled and mixed with 20,000 parts of ice water. The oil which precipitates is extracted into benzene. The benzene extract is consecutively washed with water, aqueous 5% sodium bicarbonate, and water, then stripped of solvent by vacuum distillation. The residue is taken up in 2,000 parts of methanol, and to this solution is added a solution of 68 parts of potassium hydroxide in 500 parts of water. The resultant solution is heated at the boiling point in an atmosphere of nitrogen under reflux for 1 hour, then cooled and poured into 20,000 parts of ice water. The solid thrown down is filtered off, washed on the filter with water, and recrystallized from acetone to give 17aβ-methyl-D-homo-C-nor-18-nor-5α-pregnane-3β,16β,20α-triol melting at 205–208°.

(B) *17aβ - methyl-D-homo-C-nor-18-nor-5α-pregnane-3β,16β,20α-triol cyclic 16,20-acetal with acetone.*—To a stirred suspension of 47 parts of 17aβ-methyl-D-homo-C-nor-18-nor-5α-pregnane-3β,16β,20α-triol in 320 parts of acetone is added 4 parts of p-toluenesulfonic acid monohydrate. The resultant mixture is stirred for 40 minutes, then diluted with 2000 parts of water. The white crystalline solid which precipitates is filtered off, washed on the filter with water, dried in air, and recrystallized from acetone to give 17aβ-methyl-D-homo-C-nor-18-nor-5α-pregnane-3β,16β,20α-triol cyclic 16,20-acetal with acetone melting at 196–198.5°.

(C) *3β - benzoyloxy - 17aβ-methyl-D-homo-C-nor-18-nor - 5α-pregnane-16β,20α-diol cyclic acetal with acetone.*—To a solution of 17 parts of 17aβ-methyl-D-homo-C-nor-18-nor-5α-pregnane-3β,16β,20α-triol cyclic 16,20-acetal with acetone in 160 parts of pyridine is added approximately 19 parts of benzoyl chloride. The resultant mixture is heated at around 90° for 45 minutes. It is then cooled, whereupon 20 parts of water is introduced. Heating at around 90° is resumed for 20 minutes, at which point the reactants are mixed with 5 volumes of ice water. Insoluble solids are filtered off and recrystallized from ethanol to give 3β-benzoyloxy-17aβ-methyl-D-homo-C-nor-18-nor-5α-pregnane-16β,20α-diol cyclic acetal with acetone melting in the range 125–130°.

(D) *3β - benzoyloxy - 17aβ-methyl-D-homo-C-nor-18-nor-5α-pregnane-16β,20α-diol.*—A solution of 79 parts of 3β - benzoyloxy-17aβ-methyl-D-homo-C-nor-18-nor-5α-pregnane-16β,20α-diol cyclic acetal with acetone and 24 parts of p-toluenesulfonic acid monohydrate in approximately 1900 parts of methanol and 80 parts of water is heated at the boiling point under reflux for 20 minutes. The resulting mixture is cooled and mixed with 2 volumes of ice water. Insoluble solids are filtered off, washed on the filter with water, and twice recrystallized from ethyl acetate to give 3β-benzoyloxy-17aβ-methyl-D-homo-C-nor-18-nor-5α-pregnane-16β,20α-diol melting at 184.5–186°.

(E) *3β - benzoyl-17aβ-methyl-D-homo-C-nor-18-nor-5α-pregnane-16,20-dione.*—To a stirred solution of 14 parts of 3β-benzoyloxy-17aβ-methyl-D-homo-C-nor-18-nor-5α-pregnane-16β,20α-diol in 630 parts of tetrahydrofuran at −40° under a nitrogen atmosphere is cautiously added during 10 minutes approximately 27 parts of standard chromium trioxide reagent [J. Org. Chem. 21, 1547 (1956), footnote 10]. Stirring is continued while the resultant solution is allowed to warm to 0° during 4 hours, at which point stirring is stopped and the solution maintained at 0° overnight. Approximately 20 parts of 2-propanol is thereupon introduced, and the resultant mixture is concentrated to ½ volume by vacuum distillation. The concentrate is mixed with 2 volumes of ice water, and the mixture thus obtained is extracted with ethyl acetate. The ethyl acetate extract is washed with water, dried over anhydrous sodium sulfate, and stripped of solvent by vacuum distillation. The residue, recrystallized from acetone, affords 3β - benzoyloxy-17aβ-methyl-D-homo-C-nor-18-nor-5α-pregnane-16,20-dione melting at 168–172°. The product has the formula

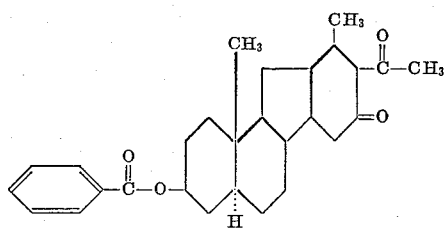

*Example 2*

*3β - hydroxy - 17aβ-methyl-D-homo-C-nor-18-nor-5α-pregnane-16,20-dione.*—A solution of approximately 12 parts of 3β - benzoyloxy-17aβ-methyl-D-homo-C-nor-18-nor-5α-pregnane-16,20-dione in 700 parts of ether is extracted with a solution of 25 parts of potassium hydroxide in a mixture of 58 parts of methanol and 18 parts of water. The alkaline extract is washed with ether, then cooled to around 5° and acidified with ice cold 20% hydrochloric acid. The resultant mixture is stripped of solvent by vacuum distillation, whereupon the residue is diluted with water and the mixture thus obtained extracted with ether. The ether extract is consecutively washed with water, aqueous 5% sodium bicarbonate, and water, then dried over anhydrous sodium sulfate and freed of solvent by distillation. The gummy residue is chromatographed on silica gel, using benzene and ethyl acetate as developing solvents. From an eluate comprising 10% ethyl acetate in benzene, on evaporation of solvent, is obtained 3β - hydroxy-17aβ-methyl-D-homo-C-nor-18-nor-5α-pregnane-16,20-dione, the formula of which is

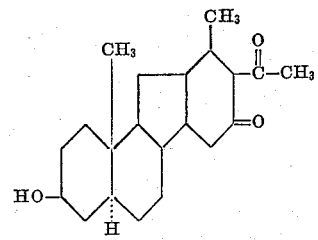

*Example 3*

*17aβ - methyl-D-homo-C-nor-18-nor-5α-pregnane-3,16,20-trione.*—To a solution of approximately 9 parts of 3β-hydroxy - 17aβ - methyl - D-homo-C-nor-18-nor-5α-pregnane-16,20-dione in 800 parts of purified acetone at 0° is cautiously added, with vigorous stirring, approximately 23 parts of standard chromium trioxide reagent [J. Org. Chem. 21, 1547 (1956), footnote 10]. The resultant mixture is stirred for an additional 5 minutes at around 0°, then allowed to warm to room temperatures with continued stirring during 20 minutes. Solvent is thereupon removed by vacuum distillation, and the residue is partitioned between 2250 parts of ethyl acetate and 100 parts of water. The ethyl acetate phase is separated, consecutively washed with water, aqueous 5% sodium bicarbonate, and water, dried over anhydrous sodium sulfate, and stripped of solvent by vacuum distillation. The residue is chromatographed on silica gel using benzene and ethyl acetate as developing solvents. From an eluate comprising 5% ethyl acetate in benzene, on evaporation of solvent, 17aβ - methyl - D-homo-C-nor-18-nor-5α-pregnane-3,16,20-trione is obtained. The product has the formula

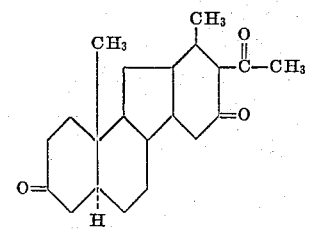

What is claimed is:
1. A compound of the formula

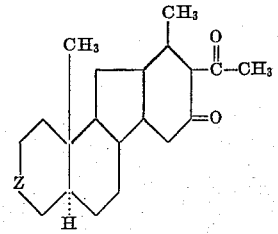

wherein Z is selected from the group consisting of carbonyl, β-hydroxymethylene, β-benzoyloxymethylene, and β-(lower alkanoyloxy)methylene radicals.

2. 3β - hydroxy-17aβ-methyl-D-homo-C-nor-18-nor-5α-pregnane-16,20-dione.

3. 3β - benzoyloxy-17aβ-methyl-D-homo-C-nor-18-nor-5α-pregnane-16,20-dione.

4. 17aβ - methyl-D-homo-C-nor-18-nor-5α-pregnane-3,16,20-trione.

References Cited

UNITED STATES PATENTS 3,228,951  1/1966  Johns et al. _____ 260—586

LORRAINE A. WEINBERGER, *Primary Examiner.*

J. H. TURNIPSEED, *Assistant Examiner.*